United States Patent

[11] 3,601,277

[72] Inventors James M. Andrews;
George H. Sollenberger, both of Pittsburgh, Pa.
[21] Appl. No. 851,681
[22] Filed Aug. 20, 1969
[45] Patented Aug. 24, 1971
[73] Assignee Sinclair-Koppers Company

[54] DISPOSABLE FOOD TRAY
2 Claims, 6 Drawing Figs.

[52] U.S. Cl.................................................. 220/20,
229/2.5
[51] Int. Cl.................................................. B65d 1/24
[50] Field of Search.......................................... 220/20,
23.6, 23.8; 206/4; 229/2.5, 35 MF, 25

[56] References Cited
UNITED STATES PATENTS

| | | | |
|---|---|---|---|
| 1,595,356 | 10/1926 | Moseman...................... | 229/2.5 UX |
| 2,738,915 | 3/1956 | St. Clair........................ | 229/2.5 |
| 3,051,346 | 8/1962 | Grogel........................... | 220/23.8 |
| 3,197,058 | 7/1965 | Hale.............................. | 220/23.6 |
| 3,203,573 | 8/1965 | Rowe ............................ | 220/23.6 |
| 3,353,886 | 11/1967 | Tompkins...................... | 206/4 X |

*Primary Examiner*—George E. Lowrance
*Attorneys*—Olin E. Williams, Oscar B. Brumback and Hubert E. Evans ABSTRACT: A disposable food tray of thermoplastic material having a main body portion and a rim surrounding the body portion, the rim having first and second pairs of opposed portions and the main body portion having a bottom wall connected to the rim by a rising wall. A first divider wall has sides that converge upwardly from the bottom wall and that merge with a flat top portion. The first divider wall has a nonlinear reversely curving configuration and is connected between one of the pairs of the opposed portions and to the bottom wall. A second divider wall, also, has sides that converge upwardly from the bottom wall and that merge with a flat top portion. The second divider wall has a nonlinear configuration and transversely intersects the first divider wall intermediate its ends and is connected between the second pair of opposed portions and to the bottom wall to form a food tray having at least four compartments. The tray is made of a thermoplastic material which decomposes under moderate heat so that after use the tray may be disposed of by burning.

PATENTED AUG 24 1971

INVENTORS
JAMES M. ANDREWS
GEORGE H. SOLLENBERGER

Finnegan, Henderson & Farabow

ATTORNEYS

PATENTED AUG24 1971 3,601,277

INVENTORS
JAMES M. ANDREWS
GEORGE H. SOLLENBERGER

*Finnegan, Henderson & Farabow*

ATTORNEYS

DISPOSABLE FOOD TRAY

BACKGROUND OF THE INVENTION

This invention relates to food trays and more particularly to food trays which can be conveniently disposed of after use.

Food trays of various types have long been used to receive food and other substances, the trays being divided into compartments to separate the different food substances from each other.

Compartmented trays of such character are ordinarily used where there is a need for conveniently serving food to a large number of people such as in cafeterias, mess halls, in airplanes and the like. More recently, such trays have also found use in packaged dinners where food is frozen by the manufacturer within the food tray and is subsequently defrosted and prepared for use within the food tray by the consumer.

In large oceangoing vessels, for example, with great numbers of crew aboard, reusable food trays have been the customary type of tray to serve food to the crew. The reusable tray is normally of metallic material so that it will stand up under normal use but it is unattractive in appearance, and must be cleaned before it can be reused. The cleaning of these metallic trays requires the use of heavy, cumbersome, and expensive machinery and the use of at least three men to operate the machinery.

It is desirable therefore to provide a food tray that is sufficiently strong enough to resist breaking in normal use and that can be readily disposed of to eliminate the men and machinery heretofore necessary to clean the metal trays.

SUMMARY OF THE INVENTION

Accordingly, this present invention provides a thermoplastic food tray having a main body portion and a rim surrounding the body portion, the rim having first and second pairs of opposed portions, and the main body portion having a bottom wall connected around its outer periphery to the rim by a rising wall. A first divider wall having a nonlinear, reversely curving configuration is connected at its base to the bottom wall and has sides that converge upwardly from the bottom wall and that merge with a top flat portion. The first divider wall extends between and is connected at its ends to the first pair of opposed rim portions. A second divider wall having a nonlinear configuration is connected at its base to the bottom wall and also has sides that converge upwardly from the bottom wall and that merge with a top flat portion. The second wall extends between and is connected at its ends to the second pair of opposed rim portions and intersects and is connected to the first divider wall intermediate its ends to form a food tray having at least four compartments.

The rim desirably comprises a flat web portion connected to the rising wall and an inclined skirt which extends outwardly and downwardly from the flat web portion. The inclined skirt preferably includes a plurality of spaced, parallel, horizontally extending steps which divide the inclined skirt into a plurality of ribs. It is also desirable that the flat top portions of the first and second divider walls as well as the flat web of the rim are coplanar.

It is preferable that the inclined walls of the first and second divider walls form an angle of 20° with a plane that is perpendicular to the bottom wall.

In a preferred embodiment, the tray of this invention includes a groove at each end of the first divider wall in juxtaposition to each of the first pair of opposed portions for receiving the user's fingers when the tray is picked up. It is also preferred that each end of the second divider wall be provided with a groove in juxtaposition to each of the second pair of opposed portion for receiving the user's fingers.

It is to be understood that both the foregoing general description and the following detailed description are exemplary and explanatory but are not restrictive of the invention.

The accompanying drawings, which are incorporated in and constitute a part of the specification, illustrate one embodiment of the invention and together with the description, serve to explain the principles of the invention.

GENERAL DESCRIPTION OF THE DRAWINGS

DETAILED DESCRIPTION

Reference will now be made in detail to the present preferred embodiment of the invention, an example of which is illustrated in the accompanying drawings.

Figure 1:
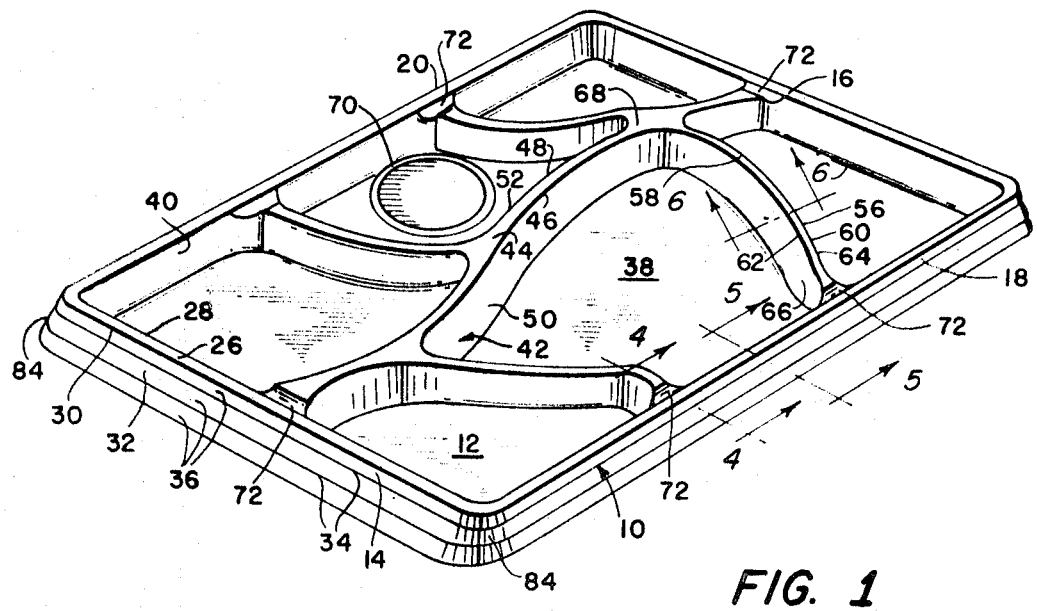
FIG. 1 is a perspective view of the disposable food tray of this invention.
Figure 2:
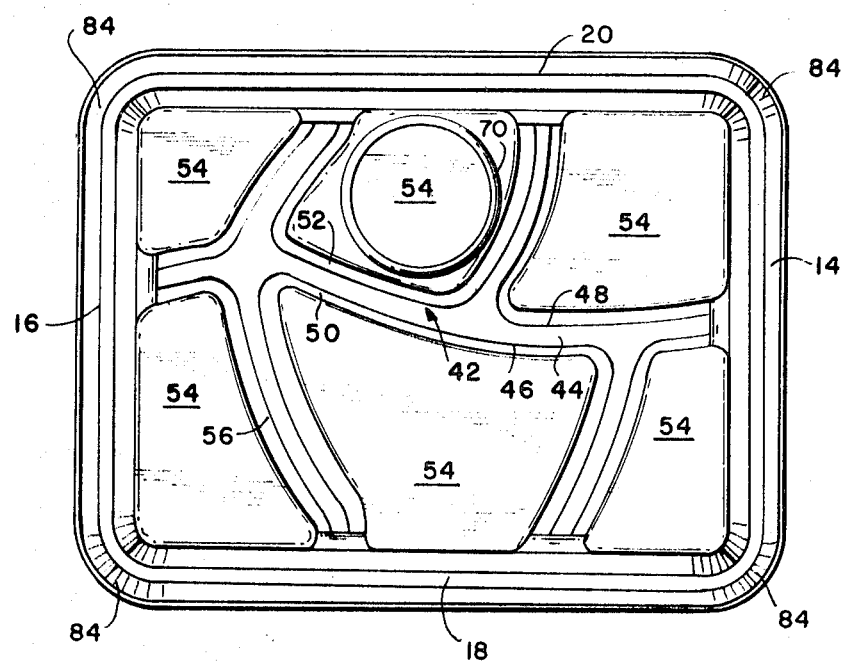
FIG. 2 is a bottom view of the disposable food tray.
Figure 3:
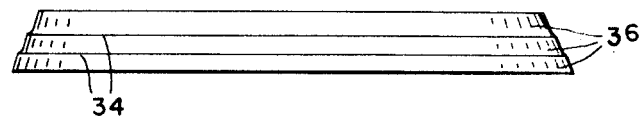
FIG. 3 is a front elevational view of the skirt of the rim.

In accordance with the invention, and as best shown in FIG. 1, the disposable food tray of this invention comprises a thermoplastic tray having a main body portion 12 and a rim, generally 10, that surrounds main body portion 12, the rim having a first pair of opposed transverse end portions 14 and 16, and a second pair of opposed longitudinal side portions 18 and 20. As best shown in FIG. 2, the pairs of opposed rim portions are substantially transverse to each other to form a tray that has a generally rectangular shape. Longitudinal side portions 18 and 20 are connected at their adjoining ends by a curved surface 84 which imparts strength and rigidity to the rim 10.

Figure 4:
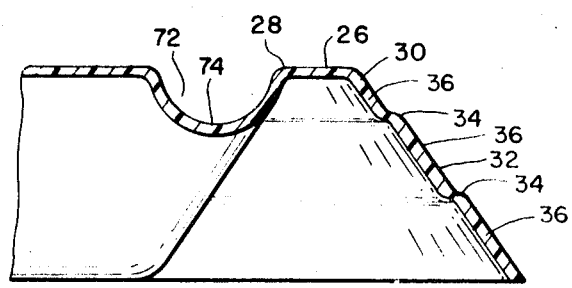
FIG. 4 is a side-sectional view taken along line IV—IV of FIG. 1 and particularly showing the end of the divider wall where it joins the rim.
Figure 5:
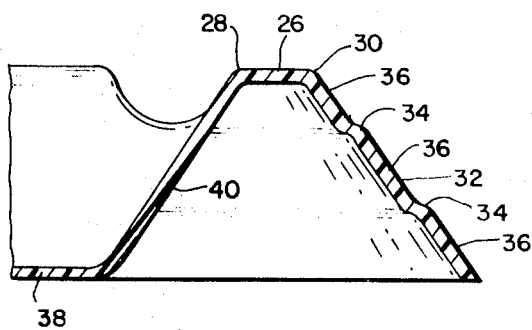
FIG. 5 is a side sectional view taken along line V—V of FIG. 1 and particularly showing the rim where it joins the rising wall of the main body portion.
Figure 6:
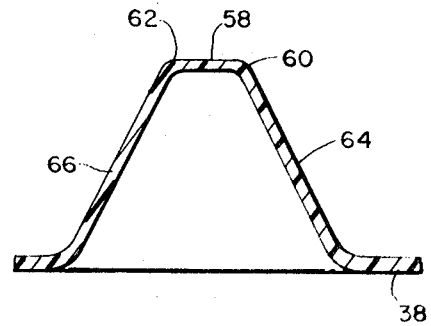
FIG. 6 is a sectional view taken along line VI—VI of FIG. 1 and particularly showing the inclined walls of a divider wall.

Rim 10 comprises a flat web portion 26 which has an inner edge 28, an outer edge 30, and an inclined skirt 32 which is joined to the outer edge 30 of the rim 10. The skirt 32 extends outwardly and downwardly from the flat web portion 26. Skirt 32 is provided with a plurality of spaced, parallel, horizontal steps 34 which divide the skirt into a plurality of horizontally extending ribs 36 which lie in parallel planes but are slightly offset from each other, with each succeeding lower rib being positioned slightly outwardly from the preceding upper rib. (FIGS. 4 and 5.)

In accordance with the invention, the main body portion has a substantially flat horizontal bottom wall 38 connected around its outer periphery to inner edge 28 of flat web portion 26 of rim 10 by an upwardly slanting and outwardly rising wall 40 which extends around the entire perimeter of the tray except at intersections with the divider walls hereinafter described. Rising wall 40 forms a channel with skirt 32 of rim 10.

In accordance with the invention, a first divider wall, generally 42, is connected at its base to the bottom wall 38 and has a nonlinear reversely curving configuration as shown in FIG. 2. The first divider wall 42 extends between and is connected at its ends to a first pair of opposed rim portions 14 and 16. The divider wall 42 has a flat top portion 44 having edges 46 and 48, and has two inclined sidewalls 50 and 52 which are connected to flat web portions 44 at edges 46 and 48. Sidewalls 50 and 52 diverge outwardly from the flat top portion 44 and are connected to bottom wall 38. In a preferred embodiment of this invention sidewalls 50 and 52 form a 20° angle with a plane that is perpendicular to bottom wall 38. An angle of 20° has been found to be the optimum angle to give maximum compartment area with maximum rigidity to the tray.

As seen in FIG. 2 bottom wall 38 is comprised of a plurality of sections 54 which are formed by the division of the bottom wall 38 by the divider walls. The nonlinear reversely curving configuration of the divider wall 42 is preferably a continuous, substantially S-shaped curve.

In accordance with the invention, there is provided a second divider wall 56 connected at its base to bottom wall 38 and having a nonlinear configuration. The second divider wall 56 extends between and is connected at its ends to the second pair of opposed rim portions 18 and 20. The divider wall 56 intersects and is connected to the first divider wall 42 intermediate its ends to form a food tray having at least four compartments. The second divider wall 56 comprises a flat top portion 58 having edges 60 and 62 and two inclined sidewalls 64 and 66 which are respectively joined to the edge 60 and 62 and diverge away from flat top portion 58. Sidewalls 64 and 66 are connected to bottom wall 38. Sidewalls 64 and 66 are similar to sidewalls 50 and 52 in that they also form an angle of 20° with a plane that is perpendicular to bottom wall 38 so that maximum compartment area with maximum rigidity is provided.

The second divider wall 56 is nonlinear and has, preferably, an arcuate configuration. The second divider wall 56 transversely intersects the first divider wall 42 intermediate the first pair of opposed rim portions 14 and 16 and is connected to the second pair of opposed portions 18 and 20 to form a food tray having at least four compartments. The intersection of the first divider wall 42 and the second divider wall 56 forms a flat platform 68 which is at the same level as flat top portions 44 and 58. Flat platform 68 is of generally quadrangular shape and provides an area of strength.

The foregoing construction of a nonlinear reversely curved divider wall, having inclined walls 50 and 52, and its intersection with rim 10 and with divider wall 56, having inclined walls 64 and 66, produces opposed stress resistant areas which strongly tend to prevent a direct line breakage when the tray is held at any position on the rim 10 as the unique combination of two intersecting divider walls, joined to the rim of the tray, reinforce the tray.

When it is desired to have more than four compartments, additional divider walls may be provided, as desired, which may extend from the first divider wall 42 to rim 10 as illustrated in FIG. 1. These additional divider walls need not extend from one portion of the rim to an opposed portion of the rim but need only extend from the rim 10 to first divider wall 42 in that the combination of having two divider walls, (42,56) each of which extend across the tray and are connected to the opposed portions of the rim 10, provide all the strength that is necessary to insure that the tray will not collapse along any lines of weakness. These additional divider walls are only for the purpose of dividing the tray into additional compartments and, although they inherently provide additional strength, they need not be used.

The food tray compartments 54 can each be designed to receive a different food substance. Preferably, one of the compartments is provided with a circular upstanding bead. In FIG. 1 a bead 70 that protrudes upwardly from the bottom of the tray forms a compartment which may receive a bottom portion of a glass or cup as desired.

In most advantageous and the preferred embodiment of this invention, a groove 72 is provided at each end of the first divider wall 42 in juxtaposition to each of the first pair of opposed rim portions 14 and 16 for receiving the user's fingers when the tray is picked up. Groove 72 has a groove wall 74 in FIG. 4 which extends arcuately downwardly from first divider wall 42 and connects the divider wall 42 to the rim 10. Preferably each divider wall of the tray is provided with a groove where the divider wall is connected to the rim so that a user's fingers may be received. Thus, each end of the second divider wall 56 has a groove 72 in juxtaposition to each of the second pair of opposed portions (18,20). The grooves 72 and the rim 10 are so designed that the user's fingers can conform to the groove and the flat web portion of the rim 10. The inclined skirt 32 of the rim 10 supports the remaining portions of the fingers and hand that are not in contact with the groove and flat web portion. The channel formed by skirt 32 and rising wall 40 also enables the hand to be placed underneath the tray to provide additional support for the tray. The horizontally extending steps 34 of inclined skirt 32 impart sufficient strength to the inclined skirt to support the fingers and the hand of the user. The construction of flat web portion 26 and inclined skirt 32 of rim 10 enables the holding forces to be distributed around the remaining areas of the rim 10 so that there exists no areas of concentrated stress that can break the tray.

Thus, it is possible to hold the food tray at any of the ends of the divider wall where a groove 72 is provided. It is also possible to grip the food tray at the corners of the food tray. Although the tray is designed for gripping at the ends of the dividers the tray has sufficient strength so that no matter where one picks up the tray, the forces applied to the tray will be insufficient along any break line. Thus, one can hold the tray at the rounded corners of the tray or any position around the rim of the tray because of the unique structural strength imparted to the tray by the combinations of having two divider walls which intersect each other and each of which is connected to opposed portions on the rim and the fact that the rim cooperates with the body of the tray to absorb and distribute the forces holding the tray. In this regard the dividing walls having flat top portions 44 and 58 with diverging downwardly sidewalls reinforces the tray. Without these types of divider walls as herein described, the stiffness and strength of the tray would be impaired, thereby requiring greater wall thicknesses to compensate for the weakness and thereby increasing the costs of producing the trays in accordance with this invention.

The tray is made by any conventional thermoforming process from commercial grade thermoplastic materials, such as a high-heat unmodified polystyrene having a stiffness modulus of 450,000 p.s.i. and sold by Sinclair Koppers Company under the trademark Dylene 8. It will be understood by those skilled in the art that other thermoplastic molding materials may also be used. The trays may be formed in a continuous process wherein a film of polystyrene is fed to a die station which heats and forms a tray in the film and then cuts the tray from the remainder of the film. The optimum thickness of the tray is 0.030 inches and the starting film thickness can be easily determined by those skilled in the art.

The trays can be conveniently stacked one upon the other since they are provided with divider walls which form recesses in the bottom of the tray so that each tray can be conveniently located and fit into the tray below and above it. The trays can be delivered in this stacked manner and when it is desired to use the tray one lifts the tray from the stack. After the tray has been used, it can easily be disposed of by merely heating it to moderately high temperatures as is well known by those skilled in the art at which temperature the tray melts or alternatively the tray may be incinerated and completely consumed, inasmuch as the molecular elements of the tray are carbon and hydrogen.

The invention in its broader aspects is not limited to the specific details shown and described, and departures may be made from such details without departing from the principles of the invention and without sacrificing its chief advantages.

What is claimed is:

1. A food tray having at least four compartments comprising:
   a. a main body having a bottom wall;
   b. a rim surrounding said body having first and second pairs of opposed portions, said rim having a flat top portion and an inclined skirt which extends outwardly from said flat web portion;
   c. a rising wall connecting the outer periphery of said body to said rim;
   d. a first divider wall connected at its base to the bottom wall and having a nonlinear, reversely curving configuration; said first wall extending between and being connected at its ends to said first pair of opposed rim portions;
   e. a second divider wall connected at its base to the bottom wall and having a nonlinear configuration; said second wall extending between and being connected at its ends to said second pair of opposed rim portions and intersecting and being connected to said first divider wall intermediate the ends of said first divider wall;
f. said first and second divider walls having
  i. a flat top portion coplanar with said flat top portion of the rim, and
  ii. two inclined sidewalls that diverge away from said flat top portion and are joined to said bottom wall of said body; and
g. said tray being composed of a thermoplastic material.

2. The invention according to claim 1, including a plurality of spaced parallel horizontally extending steps in said inclined skirt which divide said inclined skirt into a plurality of ribs.